United States Patent [19]
Wut

[11] Patent Number: 5,909,088
[45] Date of Patent: Jun. 1, 1999

[54] MOTION ACTIVATED ILLUMINATING FOOTWEAR AND LIGHT MODULE THEREFOR WITH SEQUENTIAL OSCILLATING LIGHTS

[75] Inventor: Siu Bun Wut, Hong Kong, The Hong Kong Special Administrative Region of the People's Republic of China

[73] Assignee: East Asia Services Ltd., Central Hong Kong, The Hong Kong Special Administrative Region of the People's Republic of China

[21] Appl. No.: 08/883,835

[22] Filed: Jun. 27, 1997

[51] Int. Cl.⁶ ............................ H05B 37/00; H05B 37/02
[52] U.S. Cl. .................... 315/200 A; 315/246; 315/186; 362/103; 36/137
[58] Field of Search ................. 315/200 A, 201, 315/246

[56] References Cited

U.S. PATENT DOCUMENTS

| | | | |
|---|---|---|---|
| 2,916,670 | 12/1959 | Pederson | 315/209 |
| 2,960,627 | 11/1960 | Hunt | 315/209 |
| 3,461,346 | 8/1969 | Lilly | 315/246 |
| 3,569,780 | 3/1971 | Skinner | 315/209 |
| 3,631,359 | 12/1971 | Jones | 315/200 A |
| 3,822,394 | 7/1974 | Toho | 315/228 |
| 3,854,073 | 12/1974 | Quenelle | 315/200 A |
| 3,986,144 | 10/1976 | Russo | 315/200 A |
| 4,158,922 | 6/1979 | Dana, III | 36/137 |
| 4,367,515 | 1/1983 | Beard | 362/103 |
| 5,013,972 | 5/1991 | Malkieli et al. | 315/200 |
| 5,033,212 | 7/1991 | Evanyk | 362/103 |
| 5,357,697 | 10/1994 | Lin | 36/137 |
| 5,381,615 | 1/1995 | MacMillan | 36/137 |
| 5,396,720 | 3/1995 | Hwang et al. | 36/137 |
| 5,422,628 | 6/1995 | Rodgers | 36/137 |
| 5,438,488 | 8/1995 | Dion | 362/103 |
| 5,457,900 | 10/1995 | Roy | 36/137 |
| 5,500,635 | 3/1996 | Mott | 340/323 R |
| 5,599,088 | 2/1997 | Chien | 362/103 |

FOREIGN PATENT DOCUMENTS 2675025 10/1992 France .

OTHER PUBLICATIONS

Victor F.C. Veley, The Benchtop Electronics Reference Manual, Tab Books Inc, Blue Rige Summit, PA, The Mutivibrator, pp. 429–430, 1987.

*Primary Examiner*—Don Wong
*Assistant Examiner*—Wilson Lee
*Attorney, Agent, or Firm*—Richard M. Goldberg

[57] ABSTRACT

A light module for use with a plurality of light sources mounted to footwear, includes a power supply for supplying power; an oscillation circuit for sequentially supplying power to the light sources to sequentially cause illumination of the light sources, the oscillation circuit including first and second transistors, each having an input connected to the switch circuit and an output path connected in series with a light source, first and second capacitive circuits connected between the inputs of the first and second transistors, respectively, and the output paths of the second and first transistors, respectively; and a switch circuit which supplies power to the oscillation circuit during movement of the light module and which prevents the supply of power to the oscillation circuit when the light module stops moving, the switch circuit including a third transistor having an input and an output path connected between the power supply and the oscillation circuit, a capacitive circuit connected between one terminal of the power supply and the input of the third transistor, and a motion activated coil spring switch connected between an opposite terminal of the power supply and the input of the third transistor and which alternately opens and closes a connection between the power supply and the input of the third transistor during movement of the light module and which opens the connection between the power supply and the input of the third transistor when the light module stops moving.

16 Claims, 5 Drawing Sheets

MOTION ACTIVATED ILLUMINATING FOOTWEAR AND LIGHT MODULE THEREFOR WITH SEQUENTIAL OSCILLATING LIGHTS

BACKGROUND OF THE INVENTION

This invention relates to footwear, and more particularly, is directed to motion activated illuminating footwear having a light module therein.

It is well known to position a light inside of a heel of footwear, with the light being activated all of the time. In such known construction, the light can be turned off by means of a switch extending from the heel of the footwear. See, for example, U.S. Pat. No. 4,253,253 to McCormick. However, this construction provides certain disadvantages. First, there is the possibility that the switch is not turned off, in which case the light will burn out in a very short period of time. Second, a connection must be made between the switch on the outside of the heel to the circuitry within the heel, which adds to the cost and complexity of the footwear. Third, there is the possibility that the switch can be damaged, for example, by banging the shoe against an object, since the switch is externally accessible.

For the above reasons, it is preferred to position the entire circuitry and switch therefor entirely within the heel of the footwear. In this regard, it is well known to position a light, such as a light emitting diode (LED) inside of the heel of footwear, such that the light is visible from the exterior of the footwear, with the light being activated by means of a pressure sensitive switch. In particular, when the wearer steps down and exerts pressure on the pressure sensitive switch when walking or running, a circuit is closed so as to supply power to activate the LED. When the wearer steps up, relieving pressure from the pressure sensitive switch, the circuit is opened so as disconnect power to the LED. Examples of such footwear are disclosed in U.S. Pat. No. 5,188,447 to Chiang et al, European Patent Application No. 0 121 026, and U.S. Pat. No. 3,800,133 to Duval. However, the use of a pressure sensitive switch and the associated circuit connections increases the cost and complexity of the footwear.

It is also known to position a light inside of the heel of footwear, with the light being activated by a mercury tilt switch in the footwear. See, for example, German Offenlegungsschrift No. 2,608,485, the aforementioned European Patent Application No. 0 121 026, U.S. Pat. No. 4,158,922 to Dana, III, U.S. Pat. No. 4,848,009 to Rodgers and U.S. Pat. No. 3,893,247 to Dana, III. However, the addition of the mercury tilt switch and the associated circuitry greatly adds to the cost and complexity of the footwear.

U.S. Pat. No. 5,408,764 to Wut, the entire disclosure or which is incorporated herein by reference, discloses the use of an LED inside of the heel of a shoe, and which is intermittently activated by movement of the shoe. Specifically, when the shoe is moved, the free end of a coil spring which is fixed in a cantilevered manner, is caused to intermittently complete the electrical circuit to supply current to the LED.

It is further known to provide oscillating or sequential illumination of LEDs. For example, in U.S. Pat. No. 5,438,488 to Dion, six LEDs are distributed along a plastic strip of the sneaker between the crossed laces, each of which is turned on in sequence so as to give the appearance of a light traveling along the strip as the LEDs are successively turned on. In order to accomplish this purpose, a decade counter has six outputs, each being connected to a respective LED to provide such sequential lighting. However, since the LEDs are controlled to operate sequentially and thereby produce a sequential "flashing" effect, there is no need to provide a pressure sensitive switch, mercury tilt switch or coil switch, as indicated above, to provide alternating power to the circuit. In other words, in the aforementioned circuits, the switches are activated to turn on and off in response to movement of the shoe in order to produce the flashing effect, while Dion produces the flashing effect by reason of the decade counter so that there would be no reason to provide any of the aforementioned movement sensitive switches for powering the decade counter in Dion. See also U.S. Pat. No. 5,599,088 which discusses an alternative to a motion sensitive switch, that is, flashing LEDs based on a predetermined pattern.

Other circuits which provide alternating or sequential flashing of LEDs are known in conjunction with capacitors which charge and discharge to activate the respective LEDs. See, for example, U.S. Pat. No. 2,916,670 to Pederson for a static flasher system; U.S. Pat. No. 5,013,972 to Malkieli et al for another static flasher system for use with a symbolic/religious memorial light; U.S. Pat. No. 2,960,627 to Hunt; and U.S. Pat. No. 3,631,359 to Jones. However, none of these patents discloses use of such a circuit with a shoe or with a motion sensitive switch for powering the oscillation circuit.

OBJECTS AND SUMMARY OF THE INVENTION

Accordingly, it is an object of the present invention to provide motion activated illuminating footwear that overcomes the problems with the aforementioned prior art.

It is another object of the present invention to provide motion activated illuminating footwear in which a plurality of lights are caused to sequentially or alternately illuminate.

It is still another object of the present invention to provide motion activated illuminating footwear in which an oscillation circuit provides alternate illumination of LEDs and is powered by a motion sensitive switch in the footwear.

It is still another object of the present invention to provide motion activated the footwear in which the oscillation circuit includes capacitive elements which charge and discharge to provide the alternating illumination effect.

It is a further object of the present invention in which the motion sensitive switch that powers the oscillation circuit is a cantilevered coil switch.

In accordance with an aspect of the present invention, a light module for use with a plurality of light sources mounted to footwear, includes a power supply for supplying power; an oscillation circuit for sequentially supplying power to the light sources to sequentially cause illumination of the light sources; and a switch circuit which supplies power to the oscillation circuit during movement of the light module and which prevents the supply of power to the oscillation circuit when the light module stops moving.

The oscillation circuit includes first and second transistors, each having an input connected to the switch circuit and an output path, a first series connection of the output path of the first transistor with a first one of the light sources, a second series connection of the output path of the second transistor with a second one of the light sources, with the series connections being connected in parallel with each other and between the power supply and the switch circuit, and first and second capacitive circuits, the first capacitive circuit being connected between the input of the first transistor and the output path of the second transistor, and the second capacitive circuit being connected between the input of the second transistor and the output path of the first transistor. Each of the first and second capacitive circuits includes a capacitor. Further, a first resistive circuit is connected between the input of the first transistor and the switch circuit, and a second resistive circuit is connected between the input of the second transistor and the switch circuit. Preferably, each transistor is a bi-polar transistor having a base as the input thereof and an emitter-collector path as the output path thereof, and each light source includes a light emitting diode.

The switch circuit includes a transistor having an input, and an output path connected between the power supply and the oscillation circuit; a capacitive circuit connected between one terminal of the power supply and the input of the transistor; and a motion activated switch connected between an opposite terminal of the power supply and the input of the transistor and which alternately opens and closes a connection between the power supply and the input of the transistor during movement of the light module and which opens the connection between the power supply and the input of the transistor when the light module stops moving.

The motion activated switch includes a spring switch connected in a cantilevered manner such that one end of the spring switch is electrically connected to one of the power supply and the input of the transistor, and an opposite free end of the spring switch intermittently electrically connects with the other of the power supply and the input of the transistor during movement of the light module. In addition, a resistive element is connected at one end to the input of the transistor and at an opposite end to the motion activated switch and the capacitive element. Again, the transistor is preferably a bi-polar transistor having a base as the input and an emitter-collector path as the output path thereof.

In accordance with another aspect of the present invention, a light module for use with a plurality of light sources mounted to footwear, includes a power supply for supplying power; an oscillation circuit for sequentially supplying power to the light sources to sequentially cause illumination of the light sources, the oscillation circuit including first and second transistors, each having an input connected to the switch circuit and an output path, a first series connection of the output path of the first transistor with a first one of the light sources, a second series connection of the output path of the second transistor with a second one of the light sources, with the series connections being connected in parallel with each other and between the power supply and the switch circuit, first and second capacitive circuits, the first capacitive circuit being connected between the input of the first transistor and the output path of the second transistor, and the second capacitive circuit being connected between the input of the second transistor and the output path of the first transistor; and a switch circuit which supplies power to the oscillation circuit during movement of the light module and which prevents the supply of power to the oscillation circuit when the light module stops moving, the switch circuit including a third transistor having an input, and an output path connected between the power supply and the oscillation circuit, a capacitive circuit connected between one terminal of the power supply and the input of the third transistor, and a motion activated switch connected between an opposite terminal of the power supply and the input of the third transistor and which alternately opens and closes a connection between the power supply and the input of the third transistor during movement of the light module and which opens the connection between the power supply and the input of the third transistor when the light module stops moving.

The above and other objects, features and advantages of the invention will become readily apparent from the following detailed description thereof which is to be read in connection with the accompanying drawings.

DETAILED DESCRIPTION OF THE PREFERRED EMBODIMENTS

Figure 1:
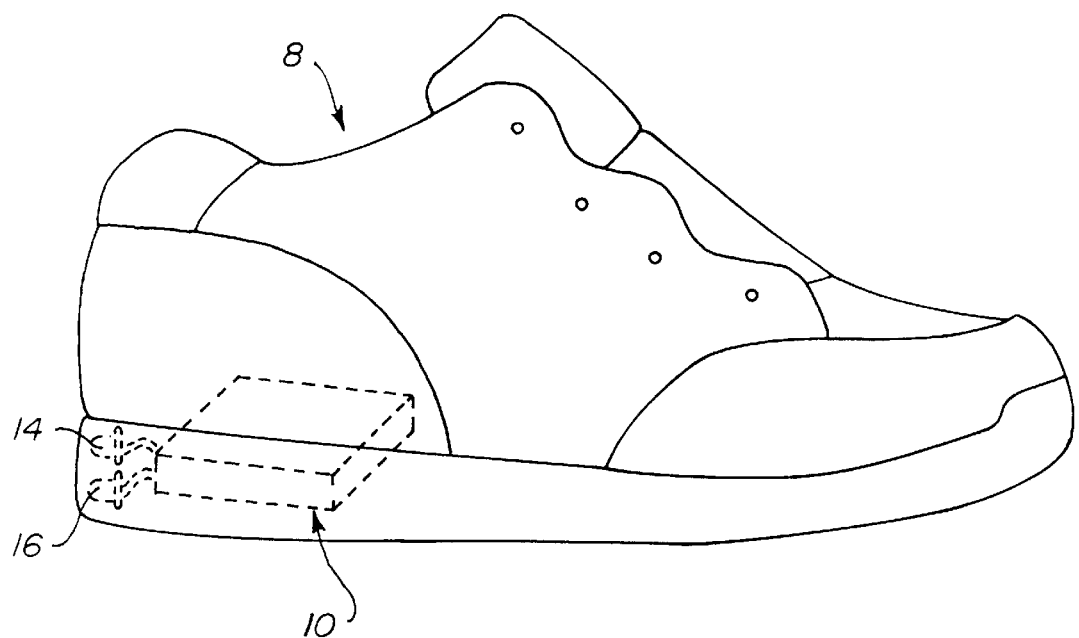
FIG. 1 is a perspective view of a running shoe, with the location of the light nodule shown in phantom therein.
Figure 2:
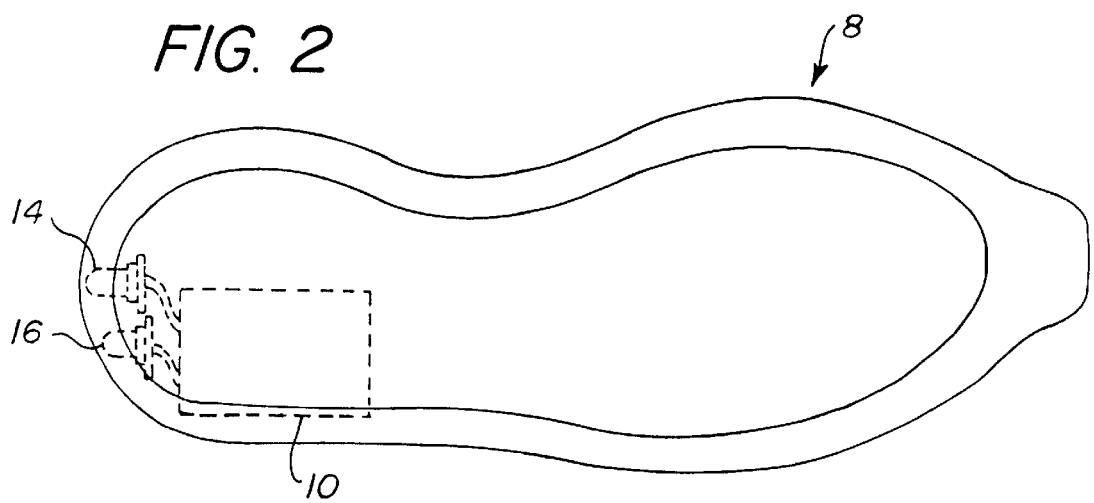
FIG. 2 is a bottom plan view of the running shoe of FIG. 1, with the light module shown in phantom therein.
Figure 3:
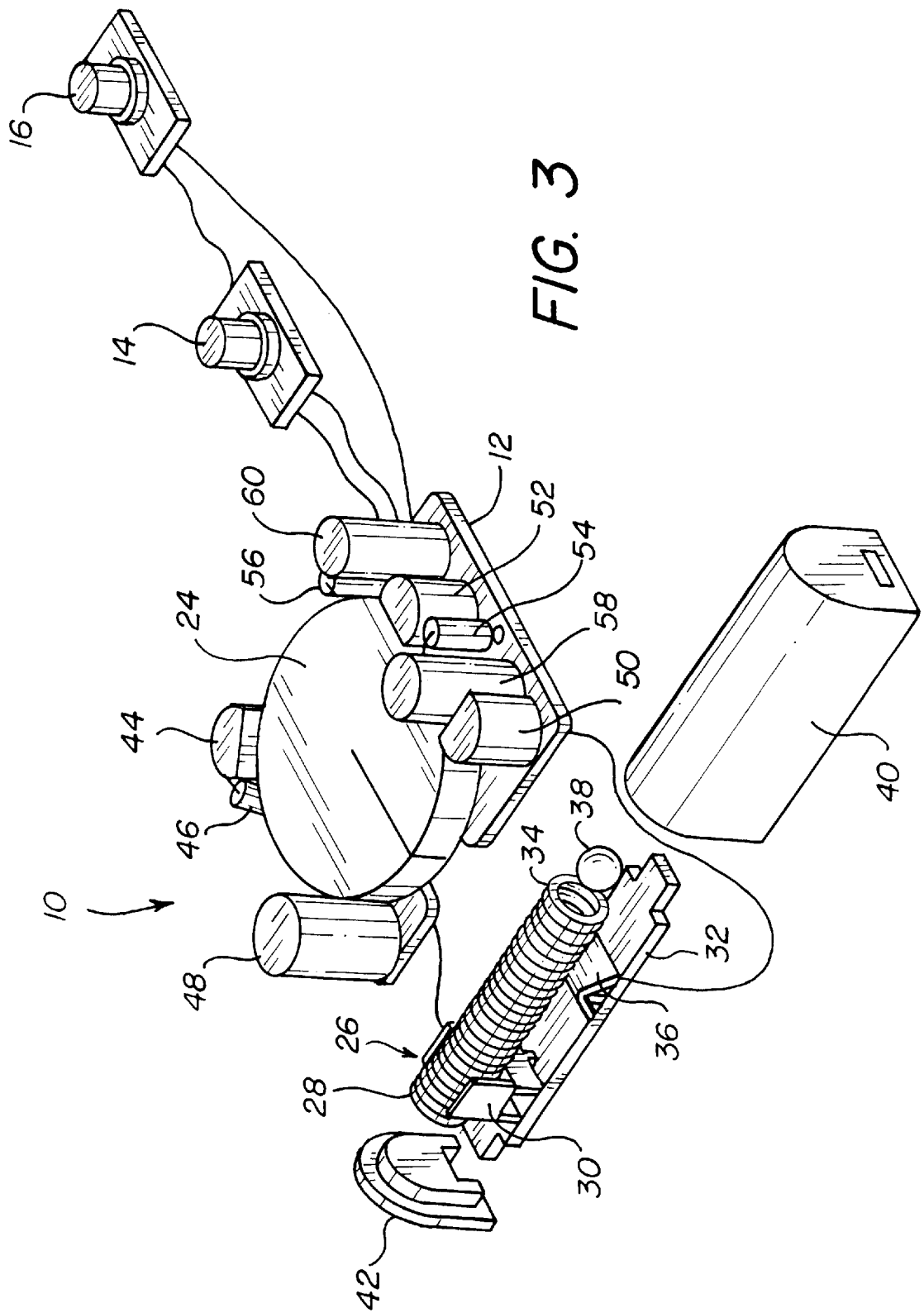
FIG. 3 is a partially exploded perspective view of a light module of the motion activated illuminating footwear according to one embodiment of the present invention.
Figure 4:
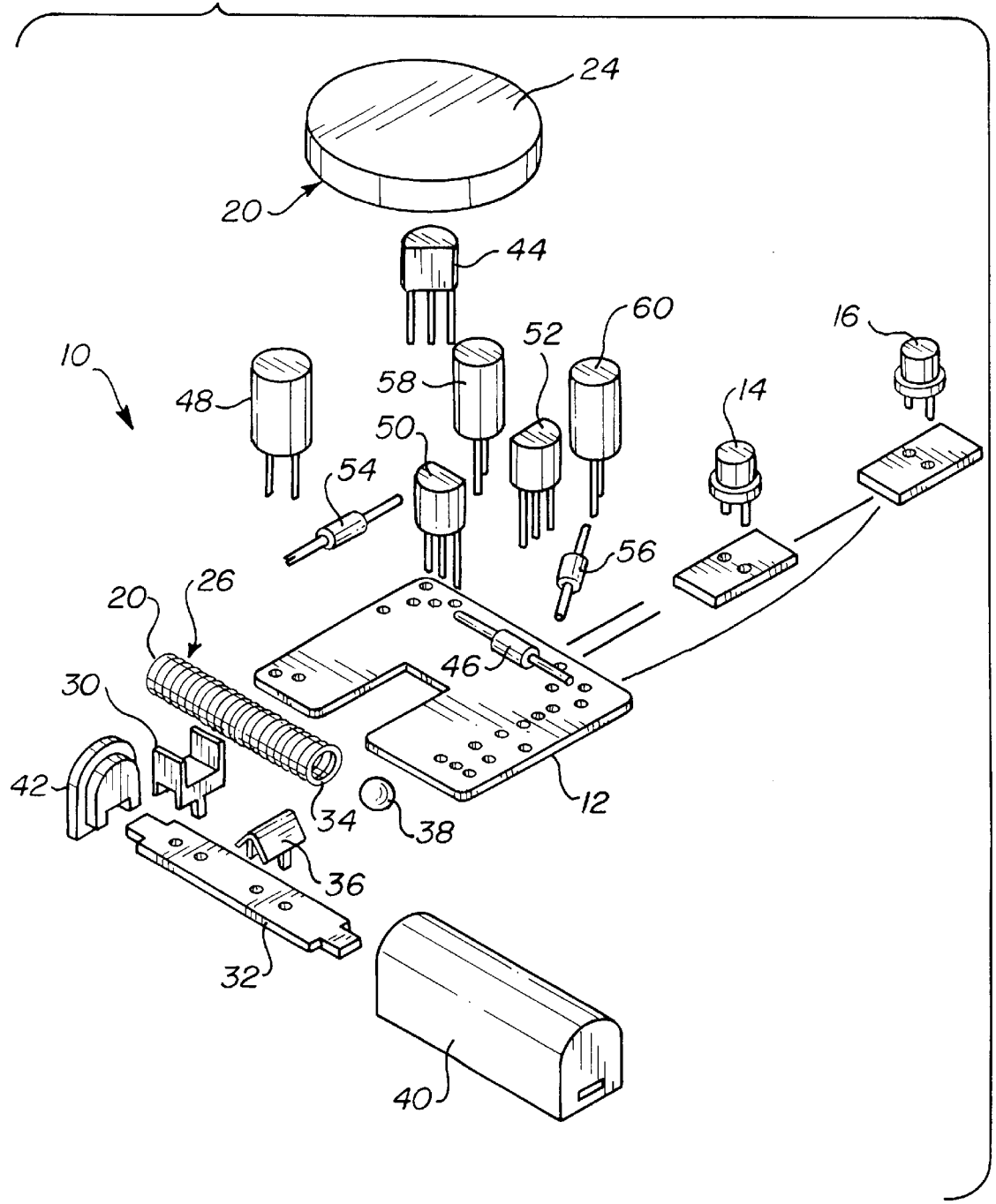
FIG. 4 is a fully exploded perspective view of the light module of FIG. 3.

Referring to the drawings in detail, and initially to FIGS. 1–5 thereof, footwear 8 such as a running shoe or the like includes a light module 10, according to a first embodiment of the present invention, incorporated into the heel of the footwear, in a similar manner to U.S. Pat. No. 5,408,764.

Light module 10 includes a printed circuit board 12 having various electrical components mounted thereon. Specifically, and referring to FIGS. 3–5, light module 10 includes first and second LEDs 14 and 16 which are sequentially or alternately illuminated by an oscillation circuit 18 that is powered by a power supply 20 through a motion sensitive switch circuit 22, as shown best in FIG. 5.

Specifically, power supply 20 can be comprised of a three volt battery 24 which is mounted on printed circuit board 12.

Motion sensitive switch circuit 22 is formed by a coil spring 26 having one end 28 thereof fixedly mounted to a spring holder 30 which, in turn, is mounted to one end of an elongated printed circuit board 32. The opposite end 34 of coil spring 26 is free, such that coil spring 26 is mounted in a cantilevered manner on printed circuit board 32. The opposite free end 34 of coil spring 26 is mounted in spaced relation above a metal arch 36 that is fixed to the opposite end of printed circuit board 32. A weighting ball 38 is secured to the free end 34 of coil spring 26. In the stationary position of footwear 8, free end 34 is positioned slightly above, but in spaced relation to, metal arch 36. Spring holder 30, and thereby the fixed end 28 of coil spring 26, are connected by an electric wire to printed circuit board 12, while metal arch 36, and thereby free end 34 of coil spring 26 when it contacts metal arch 36, are also connected by an electric wire to printed circuit board 12.

Coil spring 26 and printed circuit board 32 are enclosed by an arcuate spring housing 40 having an end closure cap 42. Printed circuit board 32 can be secured to spring housing 40 or end closure 42 to provide a unitary assembly.

Figure 5:
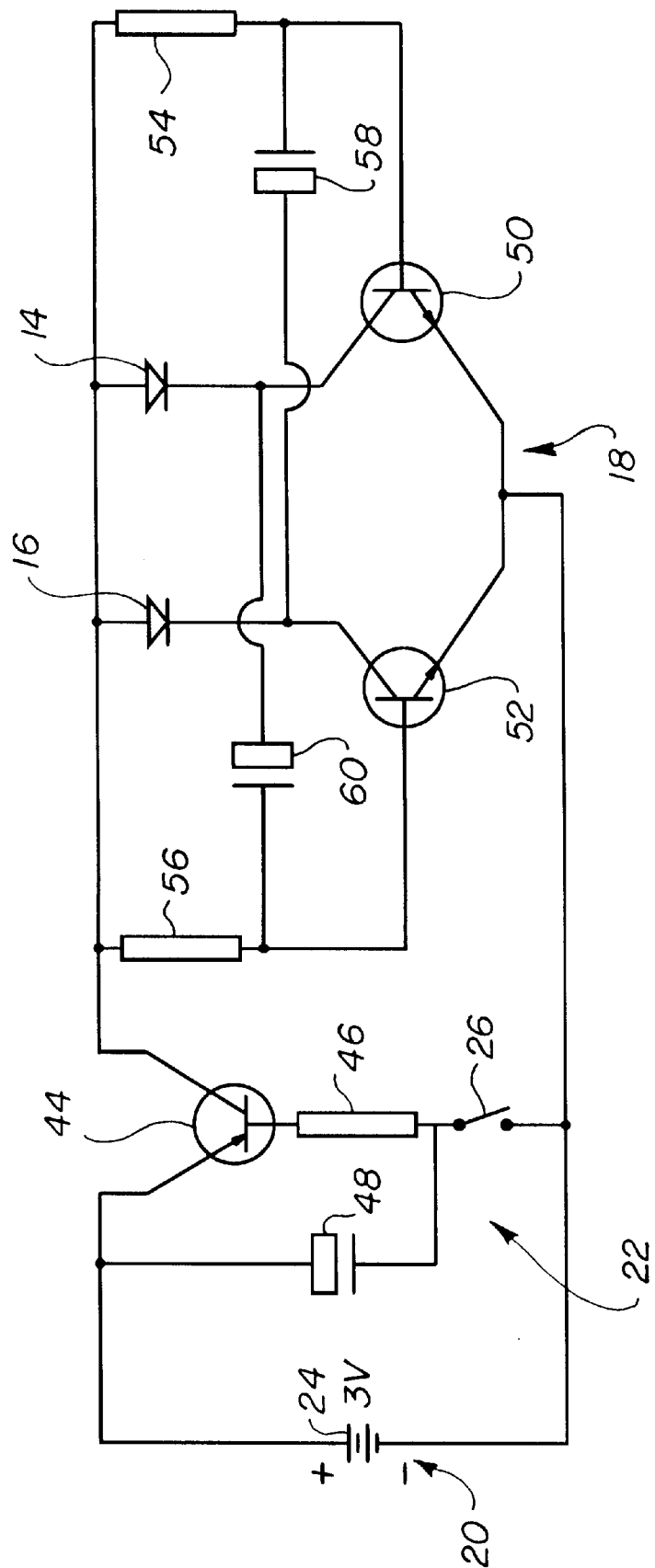
FIG. 5 is a circuit wiring diagram showing the equivalent electrical circuitry for the light module of FIG. 3.

As shown in FIG. 5, motion sensitive switch also includes a transistor 44 having its emitter-collector path connected between the positive terminal of power supply 20 and oscillation circuit 18, and its base connected to the negative terminal of power supply 20 through a series circuit of a resistor 46 and coil spring 26. Further, a capacitor 48 is connected in series with the series circuit of resistor 46 and the collector-base path of transistor 44. In other words, one terminal of capacitor 48 is connected to the junction between resistor 46 and coil spring 26, and the other terminal of capacitor 48 is connected to the junction between the collector of transistor 44 and the positive terminal of power supply 20.

With this arrangement, when free end 34 of coil spring 26 contacts metal arch 36 so as to close switch circuit 22, capacitor 48 will be charged and will build up a voltage at the base terminal of transistor 44. As a result, transistor 44 will turn on, causing current to flow through the emitter-collector path of transistor 44, which will be supplied to oscillation circuit 18. When free end 34 of coil spring 26 is out of contact with metal arch 36, the charge on capacitor 48 will maintain transistor 44 in an on condition so that current will still flow through the emitter-collector path thereof to oscillation circuit 18. Therefore, alternate contact of free end 34 with arch 36 will result in transistor 44 being maintained in an on condition.

When the shoe is stationary for a period of time, capacitor 48 will discharge through the base of transistor 44, thereby maintaining transistor 44 in an on condition until the charge on capacitor 48 falls below the threshold value necessary to turn transistor on, at which time transistor 44 will turn off, thereby closing the emitter-collector path thereof and preventing the supply of current to oscillation circuit 18.

Oscillation circuit 18 includes two transistors 50 and 52 having their emitters connected together and also connected to the negative terminal of power supply 20. The base of transistor 50 is connected to the collector-emitter path of transistor 44 through a resistor 54, while the base of transistor 52 is connected to the collector-emitter path of transistor 44 through a resistor 56. The collector of transistor 50 is connected to the cathode of LED 14, with the anode thereof connected to the collector-emitter path of transistor 44, while the collector of transistor 52 is connected to the cathode of diode 16, with the anode thereof connected to the collector-emitter path of transistor 44.

Finally, a capacitor 58 is connected between the base of transistor 50 and the collector of transistor 52, while a capacitor 60 is connected between the base of transistor 52 and the collector of transistor 50. Capacitors 58 and 60 have different charging times.

With power being supplied to oscillation circuit 18, transistors 50 and 52 will both be turned on so that current will flow through LED 14 and the collector-emitter path of transistor 50 so as to illuminate LED 14 and, at the same time, since transistor 52 is also on, current will flow through LED 16 and the collector-emitter path of transistor 52 to illuminate LED 16.

At this time, capacitors 58 and 60 also begin charging up. Because of the different charging rates of capacitors 58 and 60, one capacitor will become charged faster than the other capacitor. For example, assume that capacitor 60 becomes fully charged before capacitor 58. As capacitor 60 charges, the voltage at the base of transistor 50 decreases and, at the same time, while capacitor 58 charges, the voltage at the base of transistor 50 will also decrease. However, such transistors 50 and 52 remain on.

When capacitor 60 reaches a predetermined charge, preferably near or at full charge, the voltage at the base of transistor 52 has reduced to a level which turns transistor 52 off. Therefore, there is no longer any current through the collector-emitter path thereof so that there is no current flow through LED 16. As a result, LED 16 is extinguished. At the same time, capacitor 58 is still charging and has not reached the level at which transistor 50 turns off. Accordingly, transistor 50 is still turned on so that LED 14 is illuminated.

At this time, with transistor 50 on and transistor 52 off, capacitor 60 begins to discharge through the collector-emitter path of transistor 50. Thus, capacitor 60 is discharging while capacitor 58 is charging.

When capacitor 58 reaches a predetermined charge, preferably near or at full charge, the voltage to transistor 50 is reduced so as to turn transistor 50 off, and thereby extinguish LED 14. As a result, there is no longer a discharge path for capacitor 60 through transistor 50. However, due to the discharge of capacitor 60, the voltage at the base of transistor 52 has increased to an amount sufficient to turn transistor 52 on. Accordingly, at this time, capacitor 60 begins charging again and LED 16 is turned on so as to be illuminated. At the same time, capacitor 58 begins discharging through the collector-emitter path of transistor 52. When capacitor 60 becomes charged again, it again turns off transistor 52 and the discharge of capacitor 58 results in turning on of transistor 50 to continue the operation, and so on.

As a result, LEDs 14 and 16 are alternately or sequentially illuminated, as long as power is supplied to the circuit, that is, as long as motion sensitive switch 22 supplies power to oscillation circuit 18.

When the free end of coil spring 26 is out of contact with arch 36 for a period of time, that is, when the shoe is stationary, the charge on capacitor 48 is reduced to a level to turn off transistor 44 so that there is no power supplied to oscillation circuit 18. At this time, oscillation circuit 18 will continue to oscillate until the stored power in capacitors 58 and 60 is depleted.

Therefore, as long as the shoe is in motion, so that power is at least intimately supplied to oscillation circuit 18, LEDS 14 and 16 will continue to oscillate, that is, flash on and off alternately. Thus, the only time that LEDs 14 and 16 stop the alternating illumination is when there is a transition of switch circuit 22 from an on state to an off state.

Figure 6:
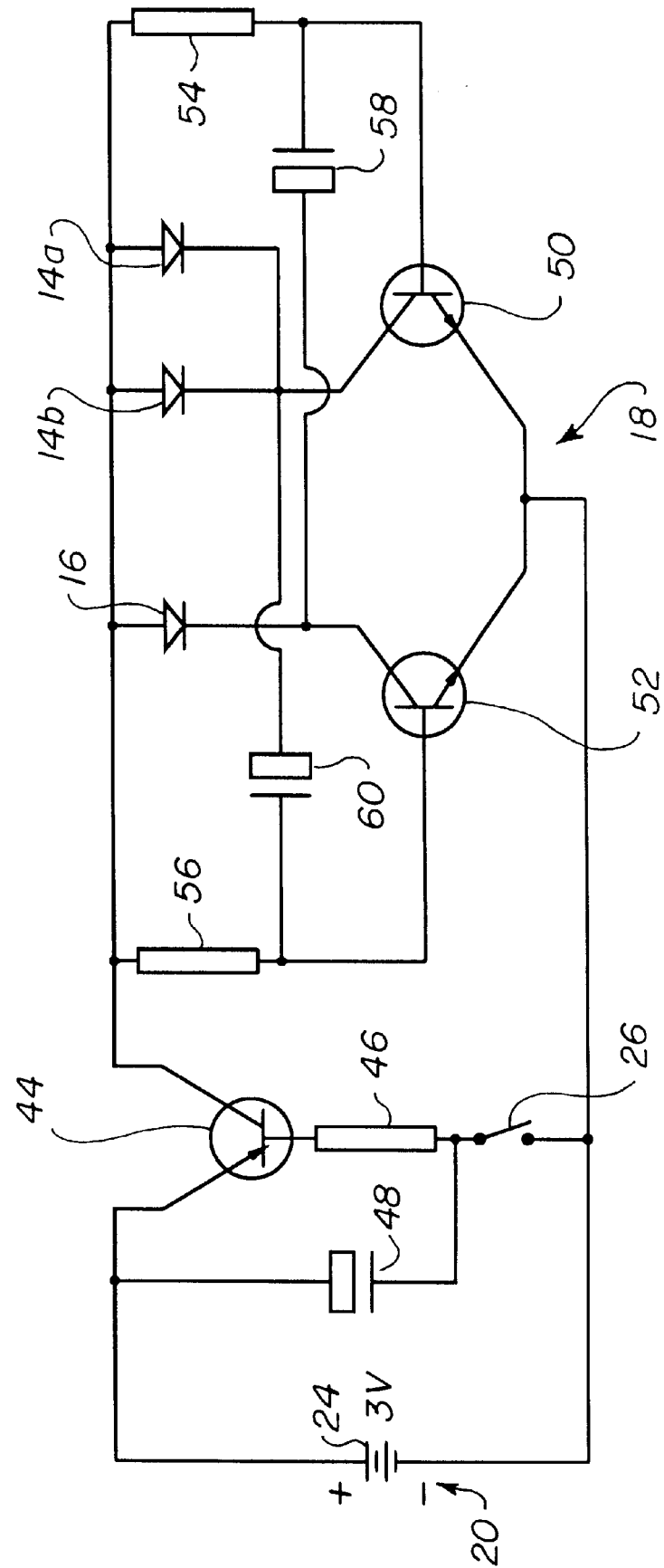
FIG. 6 is a circuit wiring diagram showing electrical circuitry of a light module according to another embodiment of the present invention.

Referring to FIG. 6, there is shown a modification of the circuit of FIG. 5 in that two LEDs 14a and 14b are provided in parallel, in place of the single LED 14 of FIG. 5. With this circuit, LEDs 14a and 14b are illuminated together and alternate with LED 16. In other words, LED 16 is first illuminated, followed by both LEDs 14a and 14b, then followed by LED 16, and so on.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A light module for use with a plurality of light sources mounted to footwear, comprising:

a power supply for supplying power;

an oscillation circuit for sequentially supplying power to said light sources to sequentially cause illumination of said light sources; and a switch circuit which supplies power to said oscillation circuit during movement of said light module and which prevents the supply of power to said oscillation circuit when said light module stops moving, said switch circuit including:

a power transistor having an input, and an output path connected between said power supply and said oscillation circuit, a capacitive circuit connected between one terminal of said power supply and the input of said power transistor, and a motion activated switch connected between an opposite terminal of said power supply and the input of said power transistor and which alternately opens and closes a connection between said power supply and said input of said power transistor during movement of said light module and which opens the connection between said power supply and said input of said power transistor when said light module stops moving.

2. A light module according to claim 1, wherein said oscillation circuit includes:

first and second transistors, each having an input connected to said switch circuit and an output path, a first series connection of the output path of the first transistor with a first one of said light sources, a second series connection of the output path of said second transistor with a second one of said light sources, with said series connections being connected in parallel with each other and between said power supply and said switch circuit, and first and second capacitive circuits, said first capacitive circuit being connected between the input of said first transistor and the output path of said second transistor, and the second capacitive circuit being connected between the input of said second transistor and the output path of said first transistor.

3. A light module according to claim 2, wherein each of said first and second capacitive circuits includes a capacitor.

4. A light module according to claim 2, further comprising:

a first resistive circuit connected between the input of said first transistor and said switch circuit; and a second resistive circuit connected between the input of said second transistor and said switch circuit.

5. A light module according to claim 2, wherein each said transistor is a bi-polar transistor having a base as the input thereof and an emitter-collector path as the output path thereof.

6. A light module according to claim 1, wherein each said light source includes a light emitting diode.

7. A light module according to claim 1, wherein said motion activated switch includes a spring switch connected in a cantilevered manner such that one end of said spring switch is electrically connected to one of said power supply and said input of said power transistor, and an opposite free end of said spring switch intermittently electrically connects with the other of said power supply and said input of said power transistor during movement of the light module.

8. A light module according to claim 1, further comprising a resistive element connected at one end to the input of the power transistor and at an opposite end to the motion activated switch and the capacitive element.

9. A light module according to claim 1, wherein said transistor is a bi-polar power transistor having a base as said input and an emitter-collector path as the output path thereof.

10. A light module for use with a plurality of light sources mounted to footwear, comprising:

a power supply for supplying power;

an oscillation circuit for sequentially supplying power to said light sources to sequentially cause illumination of said light sources, said oscillation circuit including:

first and second transistors, each having an input connected to said switch circuit and an output path, a first series connection of the output path of the first transistor with a first one of said light sources, a second series connection of the output path of said second transistor with a second one of said light sources, with said series connections being connected in parallel with each other and between said power supply and said switch circuit, first and second capacitive circuits, said first capacitive circuit being connected between the input of said first transistor and the output path of said second transistor, and the second capacitive circuit being connected between the input of said second transistor and the output path of said first transistor; and a switch circuit which supplies power to said oscillation circuit during movement of said light module and which prevents the supply of power to said oscillation circuit when said light module stops moving, said switch circuit including:

a third transistor having an input, and an output path connected between said power supply and said oscillation circuit, a capacitive circuit connected between one terminal of said power supply and the input of said third transistor, and a motion activated switch connected between an opposite terminal of said power supply and the input of said third transistor and which alternately opens and closes a connection between said power supply and said input of said third transistor during movement of said light module and which opens the connection between said power supply and said input of said third transistor when said light module stops moving.

11. A light module according to claim 10, wherein each of said first and second capacitive circuits includes a capacitor.

12. A light module according to claim 10, further comprising:

a first resistive circuit connected between the input of said first transistor and said switch circuit; and a second resistive circuit connected between the input of said second transistor and said switch circuit.

13. A light module according to claim 10, wherein each said transistor is a bi-polar transistor having a base as the input thereof and an emitter-collector path as the output path thereof.

14. A light module according to claim 10, wherein each said light source includes a light emitting diode.

15. A light module according to claim 10, wherein said motion activated switch includes a spring switch connected in a cantilevered manner such that one end of said spring switch is electrically connected to one of said power supply and said input of said third transistor, and an opposite free end of said spring switch intermittently electrically connects with the other of said power supply and said input of said third transistor.

16. A light module according to claim 10, further comprising a resistive element connected at one end to the input of the third transistor and at an opposite end to the motion activated switch and the capacitive element.

* * * * *